United States Patent [19]

Hartzell, Jr.

[11] 4,186,324
[45] Jan. 29, 1980

[54] LINEAR ACCELEROMETER WITH PIEZOELECTRIC SUSPENSION

[75] Inventor: Robert E. Hartzell, Jr., Voorhees, N.J.

[73] Assignee: Schaevitz Engineering, Pennsauken, N.J.

[21] Appl. No.: 905,010

[22] Filed: May 11, 1978

[51] Int. Cl.² ............................................. H01L 41/10
[52] U.S. Cl. .................................... 310/329; 310/330; 73/517 B
[58] Field of Search ............... 310/329, 330, 331, 332; 73/516 R, 517 R, 517 B, 518, 519

[56] References Cited

U.S. PATENT DOCUMENTS

| 3,120,622 | 2/1964 | Dranetz et al. | 310/329 X |
| 3,389,275 | 6/1968 | Brothers | 310/329 |
| 3,435,323 | 3/1969 | Wieder | 310/332 X |
| 3,727,097 | 4/1973 | Cooper | 310/332 X |
| 3,797,320 | 3/1974 | Clampitt | 73/517 B X |
| 4,020,687 | 5/1977 | Fischer | 73/517 B X |

*Primary Examiner*—Mark O. Budd

[57] ABSTRACT

A piezoelectric flexible arm member is mounted to a base at one end and supports a torque coil in a magnetic field at its other end. The torque coil comprises a seismic element disposed to be moved in accordance with acceleration forces applied thereto. A voltage is produced across the piezoelectric flexure arm when movement of the torque coil causes it to flex. The torque coil may include means to induce a signal in a position detector circuit representative of the position thereof. Both the signals from the piezoelectric member and the position detector may be used as error signals in a servo amplifier system to provide restoring forces to the torque coil and to produce an output signal representative of acceleration forces. A third conventional error signal may also be employed in the system.

7 Claims, 3 Drawing Figures

LINEAR ACCELEROMETER WITH PIEZOELECTRIC SUSPENSION

Linear servo accelerometer systems and various circuits and mechanical arrangements associated therewith are well known.

Such systems may, for example, include means to permit a movable mass to be freely moved in a pivot assembly in response to acceleration forces. The movable mass or seismic element, as in the present invention, may be the torque coil itself disposed in a magnetic field.

Position detector means, which do not form a direct part of the subject invention, are generally employed with servo amplifiers of the type involving the subject invention. A position sensor is used to generate a signal corresponding to the position of the seismic element. This signal is used as an error signal generally applied to an input circuit of an amplifier included in a servo loop. The output error signal from the servo amplifier is applied to the torque coil which tends to force back the coil to the position it was at before acceleration forces were applied.

One type of position sensor could be an oscillator in which a conductive element, which may be the seismic element, is coupled to the frequency determining tank circuit of the oscillator. When the conductive element is moved, the amplitude of the oscillator is correspondingly varied. A rectifier circuit may be provided for rectifying the output of the oscillator. The torque coil is generally physically connected to the conductive element. The output signal from the rectifying circuit is connected to the torque coil and in effect is used to oppose the acceleration forces applied to the conducting element by restoring the torque coil to a null position.

The invention involved in this application is related to a piezoelectric device which is used to generate error signals to be used as restoring forces to a torque coil after it has been moved in response to acceleration forces. Detailed showing of associated prior art arrangements as discussed above is omitted because they are well known to those skilled in the art and only incidentally related to the present invention.

Piezoelectric devices have the well known characteristic of developing voltages thereacross in response to the application of forces thereto, such as forces which cause bending. Such piezoelectric devices have been used in innumerable ways for generating electrical voltages and utilizing such generated voltages to perform certain desired functions.

It is desirable in servo accelerometer amplifier systems to produce error signals of maximum amplitudes in order to restore a movable mass to a balanced condition as quickly as possible. This assures greater accuracy in the output signal which is used to measure the acceleration forces involved.

It is an object of this invention to provide a novel means for generating an electrical signal in response to the movement of a torque coil in an accelerometer system.

It is a further object of this invention to provide an improved means for increasing the amplitude of the error signals applied to a servo amplifier.

It is still a further object of this invention to provide an improved means for generating error signals in a servo amplifier to decrease the response time required to bring the seismic element back to a null position.

In accordance with the present invention, a piezoelectric flexure member is mounted to a base and supports a torque coil of the type used in linear accelerometer systems. The torque coil, which may comprise a seismic element, is disposed in a magnetic field to have current induced therein in response to applied acceleration forces. Voltage signals are produced in the piezoelectric member when the torque coil is being moved. A position detector responds to the positions of the torque coil to produce output signals corresponding to the positions of the torque coil. Both the signals from the position detector and the piezoelectric member, along with a conventional fed back error signal, may be used as error signals to restore the torque coil to a balanced position.

Other objects and advantages of the present invention will be apparent and suggest themselves to those skilled in the art, from a reading of the following specification and claims, taken in conjunction with the accompanying drawing, in which:

Figure 1:
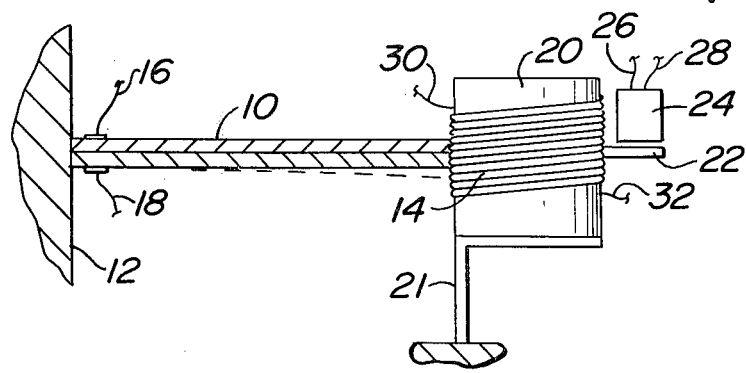
FIG. 1 is a side view, partly in cross section, illustrating the main mechanical elements used in the present invention.
Figure 2:
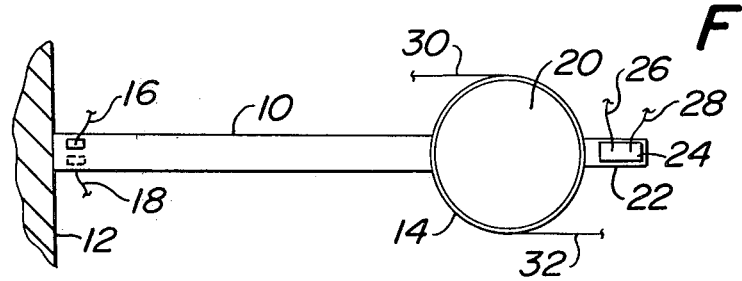
FIG. 2 is a top view of the arrangement of FIG. 1.

Referring to FIGS. 1 and 2, some of the mechanical elements of the present invention which may be used in connection with many conventional servo amplifiers for use with accelerometers are illustrated.

A flexure element or arm 10, which comprises a piezoelectric device, is mounted to a base 12 at one end and supports a torque coil 14 at its other end. The piezoelectric device 10 may be formed in multi-layers and composed of ceramic or quartz material. As is well known, when piezoelectric material is subjected to an external force, such as bending, it will generate a voltage signal thereacross. Output voltage signals produced by the piezoelectric device 10 are applied to a pair of output leads 16 and 18, which may be connected to suitable utilization circuits.

The piezoelectric member 10 is dimensioned to bend when the torque coil 14 is moved to produce a voltage signal thereacross. The torque coil 14 may comprise a seismic element in an accelerometer which is moved in accordance with velocity or acceleration. In some cases, the torque coil 14 may be connected to a separate mass which may comprise the seismic element responsive to acceleration forces.

The torque coil 14 is disposed to be moved in a magnetic field produced by a permanent magnet 20. A conductive element 22 is connected to the torque coil 14 and moves therewith. Movement of the element 22 modulates electrical signals produced by a position detector 24. The position detector may comprise an oscillator having a tuned tank circuit inductively coupled to the element 22. Variations in the positions of the element 22 causes variations in the amplitudes of the oscillation signals produced by the position detector. These variations, after suitable rectification, may be used as error signals to produce counteracting current. The counteracting currents return the torque coil 14 to a null position from the position to which it was moved by acceleration forces. As previously mentioned, such position detectors are well known to those skilled in the art. The output signal from the position detector 24 is applied to a pair of output leads 26 and 28 which are connected to a servo amplifier. The signal from the leads 26 and 28 and the signal from the leads 16 and 18, connected to the piezoelectric member 10, may be combined to produce part of a total signal which acts as an error signal to be used to restore the torque coil 14 to an equilibrium position.

The restoring current forces may be applied to the torque coil 14 through leads 30 and 32. The torque coil may include part of the output circuit of a servo amplifier, as illustrated in FIG. 3.

Figure 3:
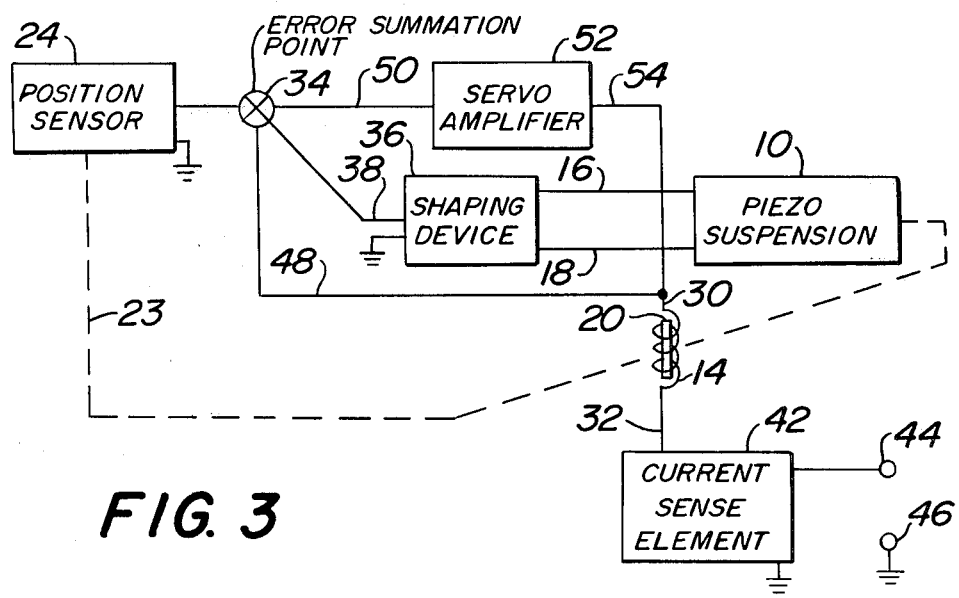
FIG. 3 is a block diagram illustrating a servo accelerometer amplifier system in which the present invention may be used.

Referring particularly to FIG. 3, the arrangement of FIGS. 1 and 2 is illustrated in connection with a servo accelerometer system including a servo amplifier. Output signals from the position sensor 24 are applied to a summing circuit 34. At the same time, output signals from the piezoelectric member 10 is applied to the summing circuit 34 through leads 16 and 18, a shaping circuit or device 36 and lead 38 and ground. A third fed back signal, which is the conventional error signal found in many conventional servo amplifiers in accelerometer systems, is applied from the output circuit across the torque coil 14 and a current sensing element 42. This error signal is applied to the summing circuit 34 through lead 48 and ground.

The summing circuit 34 may be of the type which is designed to produce a total combined signal at the output lead 50, which is equal to the sum of the applied signals from the feedback lead 48, position detector 24 and piezoelectric device 10. Such summing circuits are known and therefore not described in detail because they are not directly related to the present invention.

The total combined signal from the summing circuit 34 is applied to a servo amplifier 52 through a lead 50. The servo amplifier in effect produces an output error signal at the lead 54 which is higher than that found in conventional systems. The error signal at the output lead 54 causes a restoring current to be applied to the torque coil 14. Because of the increased total error signal, the torque coil will tend to be balanced more quickly resulting in greater accuracy of the output signals from the system which represent acceleration forces.

The current sensing element 42, which may comprise a resistor, detects the current through the torque coil 14 and develops a signal thereacross. This signal is applied to a pair of output terminals 44 and 46, with terminal 46 being grounded. Various loads to measure accelerometer forces may be connected across the output terminals 44 and 46.

It is noted that signal voltages are produced by the piezoelectric member 10 in response to velocity of the torque coil 14. The current through the torque coil is representative of the acceleration of the torque coil 14. However, both signals may be used as error signals because the precise nature of the signals are not important as long as they have the characteristic of acting as error signals to be used as restoring forces for the torque coil 14.

What is claimed is:
1. Means for generating output signals representing acceleration forces comprising:
   a. a torque coil;
   b. means for producing a magnetic field;
   c. base means;
   d. a piezoelectric flexure member connected to said base means and supporting said torque coil in said magnetic field;
   e. said piezoelectric flexure member permitting said torque coil to be moved in said magnetic field to produce voltage signals across said piezoelectric member in accordance with the movement of said torque coil; and
   f. utilization means for receiving the voltage signals produced by said piezoelectric member.

2. Means for generating output signals representing acceleration forces comprising:
   a. a torque coil;
   b. means for producing a magnetic field;
   c. base means;
   d. a piezoelectric flexure member connected to said base means and supporting said torque coil in said magnetic field;
   e. said piezoelectric flexure member permitting said torque coil to be moved in said magnetic field to produce voltage signals across said piezoelectric member in accordance with the movement of said torque coil;
   f. a position sensor to detect the positions of said torque coil and to generate electrical signals representative of said positions; and
   g. utilization means for receiving the voltage signals produced by said piezoelectric member.

3. Means for generating output signals as set forth in claim 2 wherein said utilization means includes a servo amplifier for receiving the voltage signals generated by said piezoelectric member and the electrical signals produced by said position sensor to counter balance the movement of said torque coil caused by acceleration forces.

4. Means for generating output signals as set forth in claim 3 wherein said torque coil includes a conductive element connected thereto coupled to said position sensor to vary the electrical signals produced thereby in accordance with the movements of said torque coil.

5. Means for generating output signals as set forth in claim 4 wherein current sensing means is connected to said torque coil to generate signals representing the movements and acceleration of said torque coil to be applied to an output circuit.

6. Means for generating output signals as set forth in claim 5 wherein said torque coil is disposed around a permanent magnet.

7. Means for generating output signals as set forth in claim 3 wherein additional error signals are fed back from the output circuit to the input circuit of said servo amplifier.

* * * * *